US010610913B2

(12) United States Patent
Persello et al.

(10) Patent No.: US 10,610,913 B2
(45) Date of Patent: Apr. 7, 2020

(54) ROLLING STAND FOR METAL PRODUCTS

(71) Applicant: Danieli & C. Officine Meccaniche, S.P.A., Buttrio (IT)

(72) Inventors: Carlo Persello, Moruzzo (IT); Alfredo Poloni, Fogliano di Redipuglia (IT); Daniele Andreatta, Borso del Grappa (IT); Zamir Pomare', Pasian di Prato (IT)

(73) Assignee: Danieli & C. Officine Meccaniche, S.P.A., Buttrio (IT)

(*) Notice: Subject to any disclaimer, the term of this patent is extended or adjusted under 35 U.S.C. 154(b) by 593 days.

(21) Appl. No.: 15/293,737

(22) Filed: Oct. 14, 2016

(65) Prior Publication Data

US 2017/0106419 A1 Apr. 20, 2017

(30) Foreign Application Priority Data

Oct. 16, 2015 (IT) .................. 102015000062672

(51) Int. Cl.
| | |
|---|---|
| *B21B 19/12* | (2006.01) |
| *B21B 31/08* | (2006.01) |
| *B21B 31/02* | (2006.01) |
| *B21B 28/00* | (2006.01) |
| *B21B 13/02* | (2006.01) |
| *F16D 1/09* | (2006.01) |
| *F16D 1/091* | (2006.01) |
| *B21B 27/03* | (2006.01) |
| *B21B 13/10* | (2006.01) |

(52) U.S. Cl.
CPC .............. *B21B 19/12* (2013.01); *B21B 28/00* (2013.01); *B21B 31/02* (2013.01); *B21B 31/08* (2013.01); *B21B 13/103* (2013.01); *B21B 27/035* (2013.01); *B21B 2013/025* (2013.01); *F16D 1/091* (2013.01); *F16D 2001/0906* (2013.01)

(58) Field of Classification Search
CPC ......... B21B 19/12; B21B 19/14; B21B 28/00; B21B 31/00; B21B 31/02; B21B 31/08; B21B 31/32; B21B 31/20; B21B 31/16; B21B 2203/28; B21B 2203/24; B21B 13/10; B21B 13/103; F16D 1/091; F16D 2001/0906; Y10T 403/1633; Y10T 403/22; F16B 1/005
USPC ....................................... 72/224; 403/15, 31
See application file for complete search history.

(56) References Cited

U.S. PATENT DOCUMENTS

| | | | |
|---|---|---|---|
| RE29,968 E | 4/1979 | Geese et al. | |
| 4,745,998 A * | 5/1988 | Stilin ........................ | F16D 1/09 192/74 |
| 6,390,723 B1 * | 5/2002 | Schafer .................. | B21B 27/035 403/15 |
| 6,490,901 B2 * | 12/2002 | Potthoff ................ | B21B 13/103 72/224 |

(Continued)

*Primary Examiner* — Edward T Tolan
(74) *Attorney, Agent, or Firm* — BakerHostetler

(57) ABSTRACT

Rolling stand for oblong metal products comprising a plurality of rolling rolls (11) each installed on a respective rotation shaft (12). Between at least one rotation shaft (12) and the respective rolling roll (11), a coupling member (15) is provided and is configured to couple the rolling roll (11) and the rotation shaft (12) to each other. The coupling member (15) comprises a tubular body (16) interposed between the rolling roll (11) and the rotation shaft (12) and provided with a chamber (17) in which a deformer element (18) is inserted mobile.

9 Claims, 3 Drawing Sheets

(56) References Cited

U.S. PATENT DOCUMENTS 6,666,804 B2 * 12/2003 Fabris ................... B21B 27/035
                                                      464/184
7,406,853 B2 *  8/2008 Hofmann ................ B21H 1/18
                                                      72/108

* cited by examiner

ROLLING STAND FOR METAL PRODUCTS

CROSS REFERENCE TO RELATED APPLICATIONS

This application claims priority under 35 U.S.C. § 119 from Italian Patent Application No. 102015000062672, filed on Oct. 16, 2015 with the Italian Patents and Trademarks Office, Italy, the contents of which are incorporated herein by reference.

TECHNICAL FIELD

The present invention concerns a rolling and/or finishing stand for metal products such as, merely by way of example, bars or rod.

However, possible applications of the present invention for rolling stands for tubes and/or sections other than round are not excluded.

A preferential application of the present invention, although not restrictive, is for finishing and calibration rolling stands that define the final shape of the metal product.

The present invention also concerns a method for installing and replacing the rolling rolls or rings in the rolling stand.

BACKGROUND

Rolling stands are known, comprising three or more rolling rolls or rings, disposed angularly distanced from each other, for example by 120° or 90°, and together defining a passage gap through which, during use, the metal product to be rolled transits.

For example, a solution is known for a rolling stand that comprises three or more rolling rolls or rings, each of which is installed solidly on a respective support shaft by means of a conical coupling, generated at least between the rolling roll and the support shaft.

One example of a conical coupling between the rolling roll and the support shaft is disclosed for example in U.S. RE29.968.

Solutions are also know wherein each support shaft is hollow inside to define a substantially tubular shape, and inside the support shaft a clamping pin is installed coaxial.

The clamping pin can be screwed with its first end into a head flange which is located resting also on a tubular thrust element, coupled conically on the support shaft.

The tubular thrust element is positioned in abutment against the rolling roll or ring which, in turn, rests against a tubular abutment element, also coupled conically with the support shaft.

At the opposite end of the clamping pin, a threaded nut is screwed, which in turn abuts against the end of the support shaft.

By screwing the threaded nut, the clamping pin is put under axial tension, transferring the axial force to the head flange. The head flange transfers the axial force to the tubular thrust element and to the rolling roll or ring, determining a constraint due to conical coupling of the latter on the support shaft.

To ensure that a desired mechanical interference is obtained between the rolling roll or ring and the support shaft, the latter is provided, in its thickness, with an oil feed circuit which allows to feed oil to the zone of interference between the support shaft and the rolling roll.

In particular, during the installation operations, oil at extremely high pressure, for example 3600 bar, is inserted through the feed circuit, to dilate the rolling roll or ring and the head of the support shaft. In this condition of dilation, the simultaneous tensing of the clamping pin is commanded, which determines the clamping through interference of the rolling roll or ring against the support shaft.

The tensing of the clamping pin subsequently allows to disconnect the oil feed devices and consequently to maintain, even during rolling, the correct mechanical keying pressure.

The subsequent step of removing the rolling roll or ring is then carried out in the opposite way. Therefore, oil under pressure is again fed through the feed circuit to dilate the conical interference zone between the rolling roll or ring and the support shaft, and to free the tensing of the clamping pin, unscrewing the nut from the clamping pin.

The support shaft is in turn installed on an eccentric sleeve, rotatable eccentrically with respect to the support shaft and therefore to the rolling roll or ring installed on it.

The eccentric rotation of the eccentric sleeve determines a radial adjustment of the sizes of the passage gap.

The eccentric sleeve is provided with support elements, or bearings, on which the support shaft is installed rotatable.

During the first installation and/or replacement of the rolling rolls or rings, or the removal of the support shaft, at least some of the support elements are removed. The removal of the support elements however eliminates a valid reference useful for the subsequent re-insertion of the support shaft and the attachment of the rolling roll or ring.

Removing the support elements also determines an increase in the number of components that have to be re-aligned on each occasion and from which mechanical plays and errors must be eliminated.

Furthermore, in this case a direct axial removal of the components is provided, which during these operations can slide and therefore get ruined.

Another disadvantage of this type of rolling stand is that it is particularly complex to make, given the large number of components required.

Another disadvantage is the high pressures that have to be generated to clamp and unclamp the rolling roll or ring against the support shaft. In fact, these high pressures can cause oil leakages, and possible accidents for the operators if there is damage to the oil feed apparatuses.

It is therefore a purpose of the present invention to obtain a rolling stand that is simpler to construct and that has a reduced number of components.

The reduction in the number of components also allows to obtain a rolling stand in which maintenance operations are reduced, thanks to less wear on the components.

Another purpose of the present invention is to obtain a rolling stand in which the operations to replace and/or install the rolling rolls or rings are simplified compared with known solutions.

The Applicant has devised, tested and embodied the present invention to overcome the shortcomings of the state of the art and to obtain these and other purposes and advantages.

SUMMARY

The present invention is set forth and characterized in the independent claims, while the dependent claims describe other characteristics of the invention or variants to the main inventive idea.

In accordance with the above purposes, a rolling and/or finishing stand for oblong metal products comprises a plurality of rolling rolls or rings each installed on a respective rotation shaft.

Hereafter in the description, the term rolling roll will mainly be used, although the term also refers in exactly the same way to a rolling ring.

Moreover, unless specifically indicated, the following description will be valid for stands comprising two, usually three, four or more rolling rolls or rings, which together define the passage gap through which the oblong metal product is made to transit to achieve the final desired shape and size.

As we said, the rolling rolls together define a passage gap through which during use, the oblong metal product is made to pass.

A coupling member is provided between at least one of the rotation shafts and the respective rolling roll.

In accordance with one aspect of the present invention, the coupling member comprises a tubular body interposed between the rolling roll and the rotation shaft and provided with at least one chamber in which at least one deformer element is inserted mobile and is able to be selectively driven to deform the chamber and the tubular body.

In fact, the deformation of the tubular body allows to generate a mechanical interference which is selectively releasable between the tubular body and the rolling roll so as to ensure the solid connection, or keying, of the rolling roll with the rotation shaft.

The deformer element is advantageously of the piston type, obtaining a linear mobility of the deformer element in the tubular body.

This solution, with the tubular body and the chamber outside and distinct from the rotation shaft, allows to simplify the operations to install and remove a rolling roll from the respective rotation shaft, drastically reducing the relative times.

This solution also facilitates the production steps of the components and their reciprocal assembly, as well as reducing the interference in the reciprocal movement steps.

The present invention also concerns a method to install and/or replace a rolling roll of a rolling stand on a rotation shaft which provides to couple the rolling roll and the rotation shaft by interposing a coupling member.

In accordance with one aspect of the present invention, the coupling is achieved by moving linearly at least one deformer element in at least one chamber of a tubular body interposed between the rolling roll and the rotation shaft, in order to deform the chamber and the tubular body, and thus define the mechanical coupling through interference with the through cavity with which the rolling roll is provided.

The present invention also concerns a method to remove a rolling roll from the respective rotation shaft.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF ILLUSTRATIVE EMBODIMENTS

The present invention concerns a rolling stand 10 for the rolling of oblong metal products such as, merely by way of example, bars, rod, round pieces, tubes or suchlike.

Figure 1:
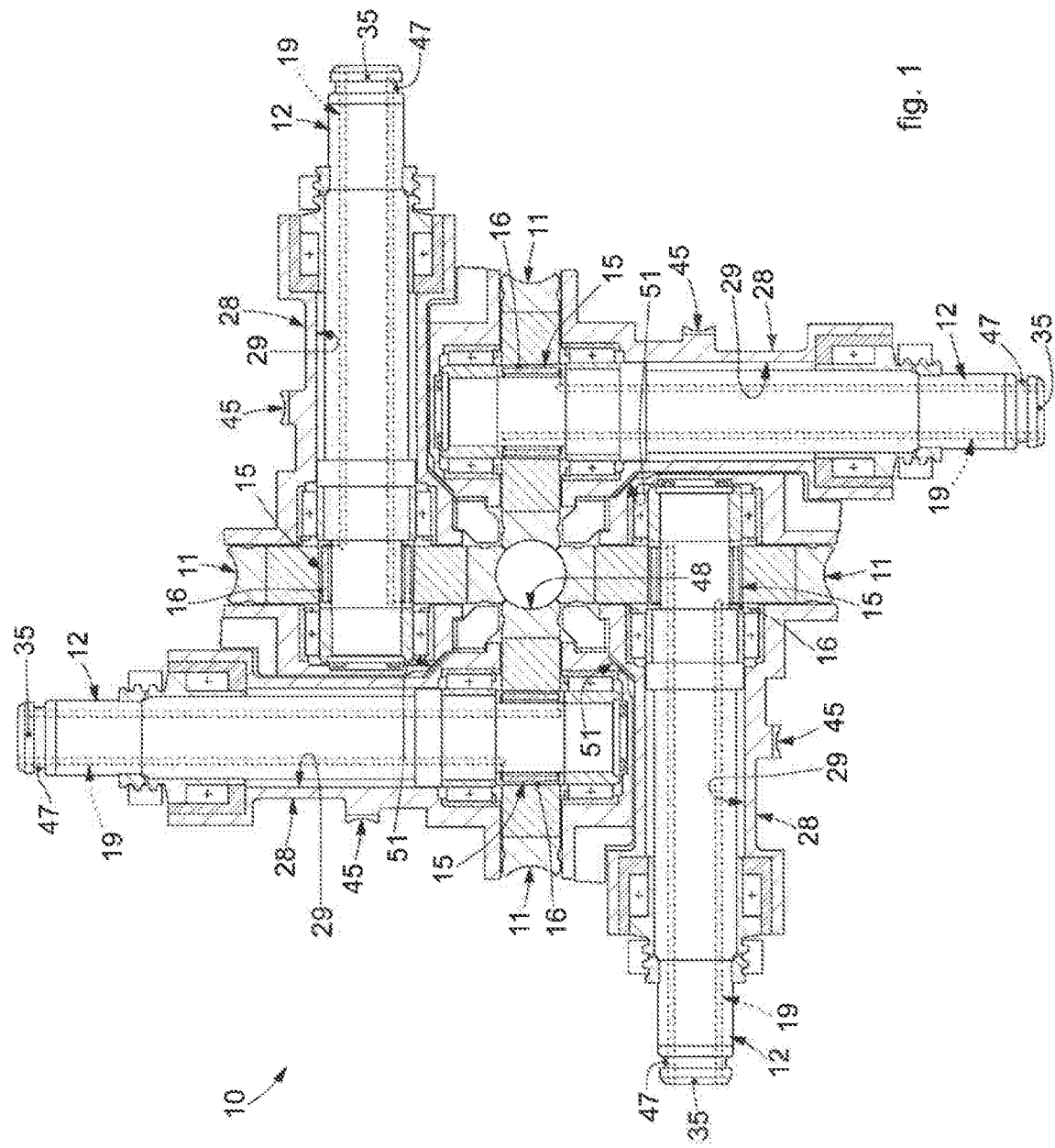
FIG. 1 is a schematic view in section of a rolling stand for metal products in accordance with the present invention.

The rolling stand 10 comprises at least two rolling rolls 11, generally three rolling rolls 11, four as in the embodiment shown in FIG. 1, or more rolling rolls.

If there are four rolling rolls 11, they can be disposed on the same plane in opposite pairs, to define a "+" or "×" configuration, that is: a first pair of rolls disposed horizontal and a second pair of rolls disposed vertical, or with a first pair of rolls disposed angled with respect to the horizontal and a second pair of rolls distanced angularly, for example by 90°, with respect to the first pair of rolls.

The rolling rolls 11 together define between them a passage gap 48, through which, during use, the metal product is made to transit.

Each rolling roll 11 is installed on a rotation shaft 12 as described below.

Figure 2:
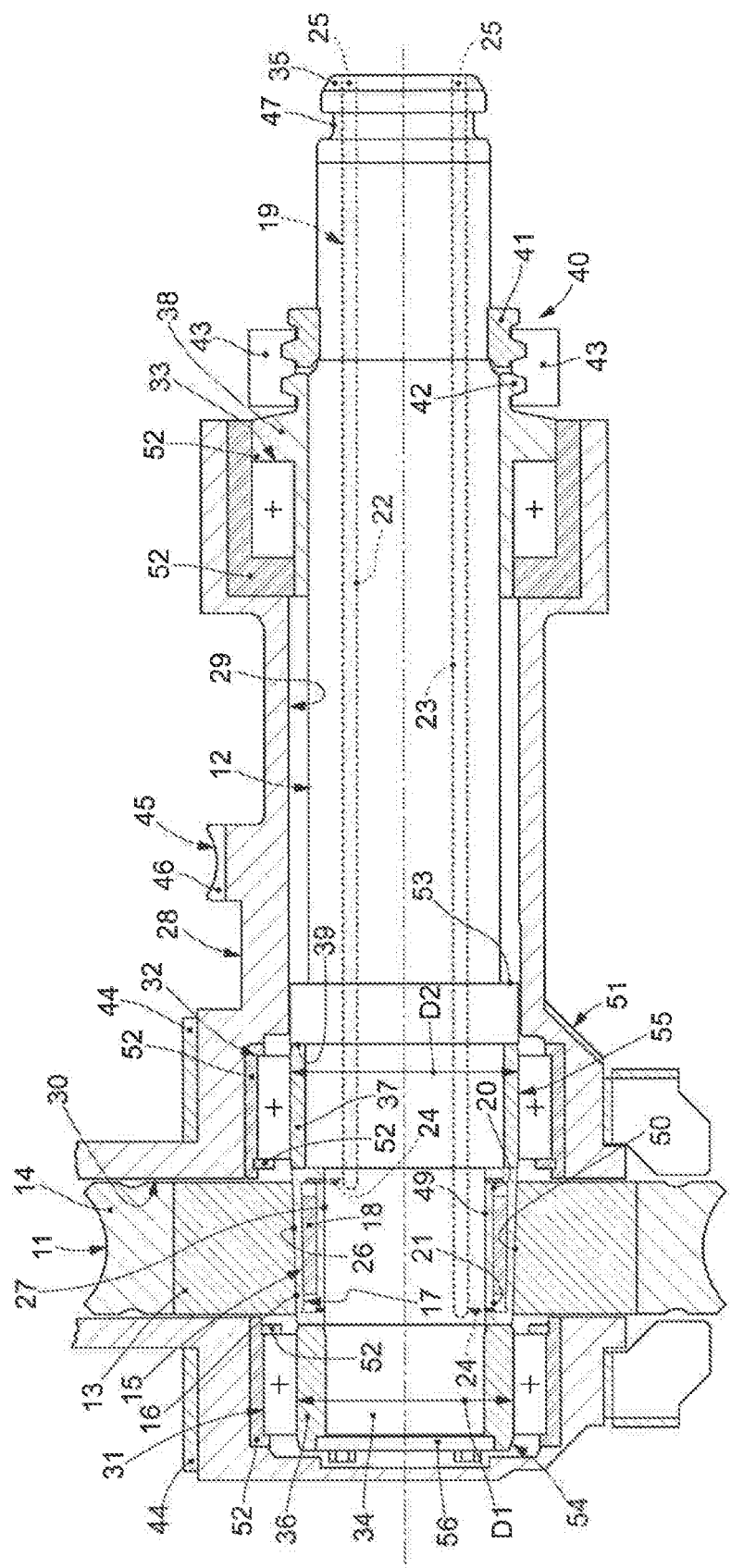
FIG. 2 is a schematic view in section of a part of the rolling stand in FIG. 1.

In accordance with the solution shown in FIG. 2, the rolling roll 11 can comprise a hub 13, coupled with the rotation shaft 12 during use, and a ring 14 solidly attached to the hub 13 and selectively replaceable or restorable with respect to the hub 13, for example when worn.

Between the rotation shaft 12 and the respective rolling roll 11 a coupling member 15 is provided configured to selectively and solidly constrain the reciprocal coupling between the rolling roll 11 and the rotation shaft 12.

The coupling member 15 comprises a tubular body 16 interposed between the rolling roll 11 and the rotation shaft 12 and provided with at least a chamber 17 in which at least one deformer element 18 is inserted mobile in the chamber 17 and selectively able to be driven to deform the latter and, as a consequence, to deform the tubular body 16 and define a coupling by interference, or keying, of the rolling roll 11 on the rotation shaft 12.

According to a possible solution, the chamber 17 is made in the thickness of the tubular body 16, it is substantially closed with respect to the outside and is connected to a fluid-dynamic circuit 19 to feed a work fluid, generally oil.

The circulation of the work fluid in the chamber 17 determines a movement, in this case axial, of the deformer element 18 in the chamber 17 and, as a consequence, the radial deformation of the tubular body 16, which determines, in its turn, a mechanical interference of the latter with the rotation shaft 12 and the rolling roll 11.

In accordance with the solution shown in FIG. 1, the deformer element 18 has a conical tubular conformation, with a cuneiform shape of the cross section or of the thickness of the tube.

By cuneiform shaped cross section we mean that the wall that interfaces with the chamber can have a linear, curved or rounded development, or a possible combination of linear and curved.

According to the solution shown in FIG. 2, the chamber 17 has a substantially annular shape mating with a corresponding annular shape of the deformer element 18.

In particular, the chamber 17 has a cuneiform cross section shape mating with part of the shape of the cross section of the deformer element 18.

The deformer element 18 allows to define a first compartment 20 and a second compartment 21 in the chamber 17, separate from each other and through which the work fluid is fed or expelled to respectively activate or de-activate the coupling member 15 and therefore define the reciprocal connection between rotation shaft 12 and rolling roll 11.

As a consequence, the tubular body 16 and the deformer element 18 together define a linear actuator, in which the tubular body 16, with its chamber 17, acts as a cylinder while the deformer element 18 acts as a piston sliding linearly in the chamber 17.

The movement of the deformer element 18 in the chamber 17 determines its interference against the internal walls of the latter with a consequent deformation of the deformer element 18.

In accordance with a possible solution shown in FIGS. 1 and 2, the fluid-dynamic circuit 19 is made in the thickness of the rotation shaft 12. This allows to contain the overall bulk of the rolling stand 10 and avoids having components, such as feed circuits for the work fluid, which interfere with the movements of the various parts of the rolling stand 10.

According to the embodiment in FIG. 2, the fluid-dynamic circuit 19 is provided respectively with a first feed branch 22 and a second feed branch 23 connected to the first compartment 20 and respectively to the second compartment 21 of the chamber 17.

In accordance with the solution shown in FIG. 1, the first feed branch 22 and the second feed branch 23 are made in the rotation shaft 12, parallel to its longitudinal development, and with feed channels 24 located in fluidic communication with the first compartment 20 and the second compartment 21 of the chamber 17.

The first feed branch 22 and the second feed branch 23 are both provided with a connection end 25 in correspondence to each of which the work fluid is respectively fed or discharged.

The connection ends 25 can be made in correspondence to a free end of the rotation shaft 12 so as to allow, when necessary, an easy connection of feed members of the work fluid, not shown in the drawings.

The first feed branch 22 and the second feed branch 23, in correspondence to their connection ends 25 for example, can be provided with interception valves, for example non-return valves, not shown, configured to prevent the work fluid exiting from the first compartment 20 and from the second compartment 21 and from the first feed branch 22 and the second feed branch 23, ensuring over time the position in a condition of interference of the deformer element 18 in the chamber 17, and therefore preventing possible vibrations, over time, from slackening the interference action.

In accordance with a possible solution, the work fluid is introduced into the first compartment 20 or the second compartment 21 with a pressure comprised between 900 bar and 1,500 bar, preferably between 1,100 bar and 1,300 bar, that is, much lower working pressures than in the known solutions described above, with all the consequent advantages.

This value of pressure is sufficient to activate the wedging of the deformer element 18 in the chamber 17 of the tubular body 16 and, as a consequence, deform the latter and define the action of mechanical interference with the rolling roll 11.

According to one embodiment of the invention, the tubular body 16 is provided with an external surface 26 with a circumferential development and a conical profile, for example with a conicity comprised between 1:12 and 1:40.

The rolling roll 11 is provided, in its turn, with a coupling seating 50, made in the case shown in the hub 13, which is coupled with the coupling member 15.

According to a possible solution, the coupling seating 50 has a conical profile as well, substantially mating with the conical profile of the external surface 26.

This ensures a perfect same-shape coupling between the coupling seating 50 and the external surface 26, ensuring the reciprocal contact thereof, uniformly distributed on the entire zone of their coupling.

In accordance with one solution, the orientation of the conicity of the external surface 26 of the tubular body 16 is the same orientation as that of the deformer element 18, allowing, in this way, to amplify the deformation action and therefore the interference between the mechanical parts.

According to a possible solution, the tubular body 16 is inserted with its through cavity 49 on the rotation shaft 12, in correspondence to a coupling portion 27 of the latter.

The through cavity 49 has a mating cylindrical shape, also in size, with that of the coupling portion 27 in order to guarantee a reciprocal adherence.

According to a possible solution, the rotation shaft 12 is installed on a support body 28 provided with a tubular cavity 29 in which the rotation shaft 12 is installed.

The support body 28 is also provided with a housing seating 30 made transversely to the tubular cavity 29 and configured to allow the housing of the rolling roll 11.

Between the support body 28 and the rotation shaft 12 support elements are provided, inserted in the tubular cavity 29 and suitable to support and allow the rotation of the rotation shaft 12 around its axis.

The support elements can comprise radial bearings, axial bearings, thrust bearings, mixed bearings or a possible combination thereof.

In accordance with the solution shown in FIG. 2, first support elements 31 are provided in correspondence to a first end 34 of the rotation shaft 12, second support elements 32, and third support elements 33 located in correspondence to a second end 35, opposite the first end 34, of the rotation shaft 12.

The second support elements 32 are positioned between first support elements 31 and the third support elements 33, and the rolling roll 11 is installed between the first support elements 31 and the second support elements 32.

In accordance with the solution in FIG. 2, respective holding elements 52 are associated with the first support elements 31, the second support elements 32 and the third support elements 33, and are configured to constrain the axial positioning of the support elements 31, 32, 33 to the support body 28. In this way, the first support elements 31, the second support elements 32 and the third support elements 33 remain in position with respect to the support body 28, even when the rotation shaft 12 is removed for the replacement of the rolling roll 11, thus supplying a guide for the movement of the rotation shaft 12.

The holding elements 52 can comprise, merely by way of example, O-rings, bushings, ring nuts, shoulders, abutment portions, or elements with similar or comparable functions.

Merely by way of example, the first support elements 31 and the second support elements 32 can be configured to support radial loads due to the rolling stresses that are transmitted by the rolling roll 11, while the third support elements 33 can be configured to support at least the axial loads, and possibly also the radial loads.

In accordance with a possible embodiment of the present invention, the rotation shaft 12 is provided with a first support portion 54 and at least a second support portion 55 located directly upstream and downstream of the coupling member 15 and cooperating with at least some of the support elements, in this case with the first support elements 31 and with the second support elements 32, and with sizes, or diameters, different from each other. In this way it is possible to facilitate the keying and unkeying of the rolling roll 11 to/from the rotation shaft 12.

In particular, it can be provided that the first support portion 54 has a first size D1, or first diameter, and the second support portion 55 has a second size, or second diameter D2, which is bigger than the first size D1. The first support portion 54, in an axial direction, is located nearer the first end 34 of the rotation shaft 12, compared with the second end 35. This allows to insert the rotation shaft 12 in a guided manner on the first support portion 54 and the second support portion 55, preventing sliding between the parts or reciprocal interferences in insertion. According to another embodiment of the present invention, the tubular body 16 has a taper that develops and is contained between the first size D1 and the second size D2, thus guaranteeing an effect of centering the rolling roll 11 on the rotation shaft 12.

According to a possible solution, not shown, the first support portion 54 and the second support portion 55 are made in a single body on the rotation shaft 12.

According to a variant, shown in FIGS. 1-5, the first support portion 54 and the second support portion 55 comprise respective bushings, in the case shown a first bushing 36 and a second bushing 37, installed on the rotation shaft 12 and which define the first size D1 and the second size D2.

The first support elements 31 and the second support elements 32 are installed on the first bushing 36 and the second bushing 37.

According to the solution shown in FIG. 2, a third bushing 38 can also be associated with the rotation shaft 12, configured to support the third support elements 33.

The support bushings are substantially cylindrical in shape, hollow inside and are configured to be inserted, for example with interference, on the rotation shaft 12.

At least the first bushing 36 and the second bushing 37 function as axial positioning elements for the coupling member 15 and, in particular, allow to define a stable axial positioning thereof on the rotation shaft 12.

The second bushing 37 is positioned in abutment against a shoulder 39 provided in the rotation shaft 12, the tubular body 16 in its turn is positioned resting against the second bushing 37 and the first bushing 36 in its turn is positioned resting against the tubular body 16.

A thrust plate 56 is attached to the first end 34 of the rotation shaft 12 and is configured to thrust the first bushing 36 against the tubular body 16, the tubular body 16 against the second bushing 37 and the second bushing 37 against the shoulder 39.

According to the solution shown in FIG. 1, the third bushing 38 is installed in a fixed position with respect to the support body 28, so that with an axial movement of the rotation shaft 12, for example to replace the rolling roll 11, the third bushing 38 and the third support elements 33 remain in a fixed position to define a valid reference of axial movement and guide for the rotation shaft 12.

According to a possible embodiment, between the rotation shaft 12 and the support body 28 axial holding devices 40 are installed, configured to constrain the axial positioning of the rotation shaft 12 with respect to the support body 28.

The axial holding devices 40 comprise a first grooved profile 41 attached to the rotation shaft 12, a second grooved profile 42 attached to or made in a single body with the support body 28, in this case with the third bushing 38 attached to the support body 28, and one or more gripping jaws 43 provided with respective grooved profiles configured to cooperate with the first 41 and the second grooved profile 42 and define the axial holding of the rotation shaft 12 with respect to the support body 28.

The first grooved profile 41, the second grooved profile 42 and the grooved profiles of the gripping jaws 43 have a trapezoid cross section shape, and allow to define a precise axial positioning of the rotation shaft 12 with respect to the support body 28.

According to one embodiment of the present invention, the support body 28 is installed on support members 44, only partly shown in FIG. 1, configured to support the support body 28 and allow it to rotate around an eccentric axis of rotation with respect to that of the rotation shaft 12.

The support body 28 is provided and/or cooperates with actuation members 45, only partly shown in FIG. 1, and configured to selectively make the support body 28 rotate around its axis of rotation which is eccentric with respect to the axis of rotation of the rotation shaft 12. The rotation of the support body 28 determines a radial movement of the rotation shaft 12 and the rolling roll 11 associated with it, and therefore allows to adjust the passage gap 48 between the rolling rolls 11.

According to the solution shown in FIG. 1, the support body 28 is provided with a toothed crown 46, suitable to cooperate with respective motor means, not shown, and which make the support body 28 rotate.

The motor means can be suitably synchronized with each other so that, when one of the actuation members 45 is actuated, there is a corresponding synchronous actuation also of the other actuation members 45, and therefore a synchronized and uniform movement is obtained of all the rolling rolls 11.

According to an embodiment shown in FIG. 1, the synchronization devices 51 can be associated with each support body 28, and are provided to connect the support bodies 28 kinematically with each other, so that when one of the support bodies 28 rotates around its axis of rotation, there is a corresponding rotation of all the other support bodies 28 around their respective axes of rotation.

According to the solution in FIG. 1, the synchronization devices 51 of each support body 28 comprise a crown, or toothed sector, provided on the external surface of the support body 28 and which cooperates with a mating crown or toothed sector provided on the adjacent support body 28.

The second end 35 of the rotation shaft 12 is provided with an attachment portion 47, in the case shown here a circumferential groove, configured to allow gripping by gripping means, not shown, and to allow an axial movement of the rotation shaft 12.

The gripping means can be configured both to grip one of the attachment portions 47 and also to supply the connection of the feed members of the work fluid to the fluid-dynamic circuit 19.

Figure 3:
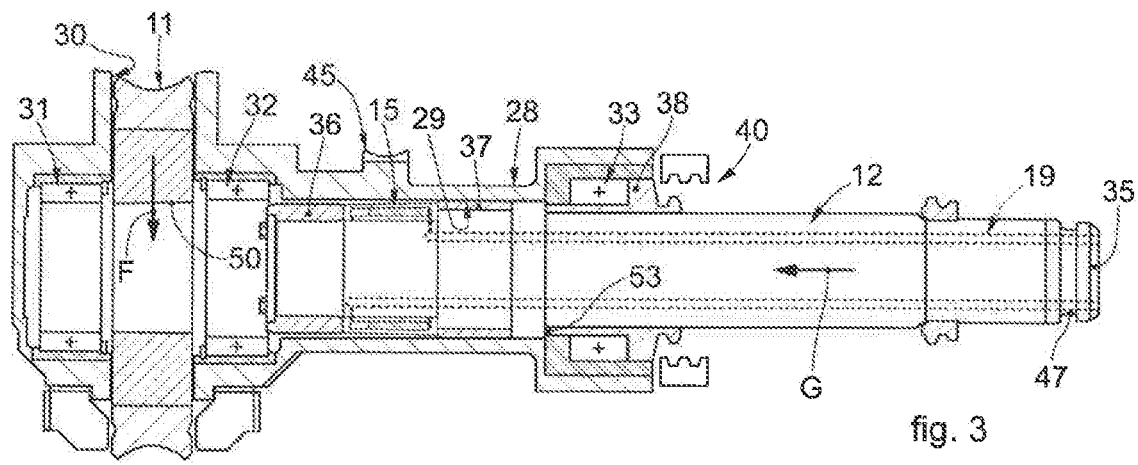
FIGS. 3-5 are schematic views of an installation sequence of a rolling roll in a rolling stand.
Figure 4:
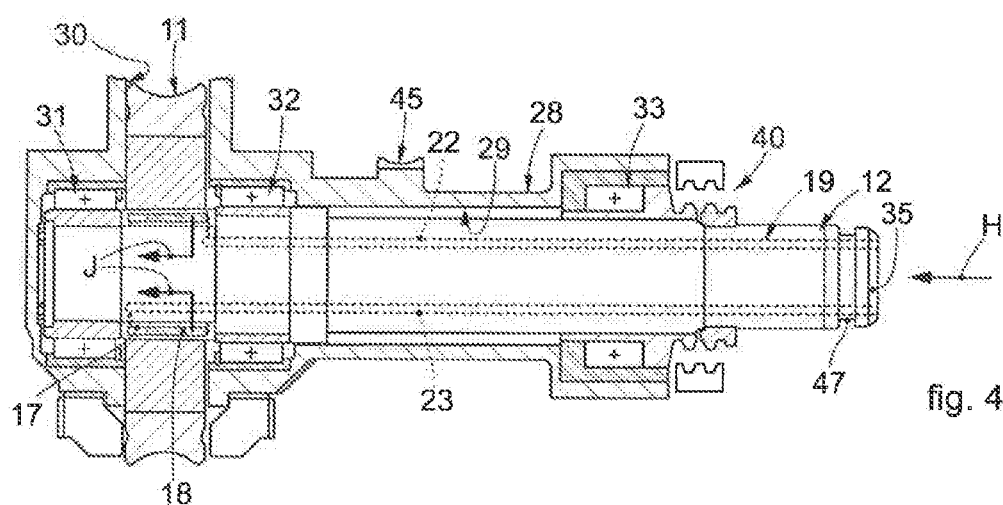
Figure 5:
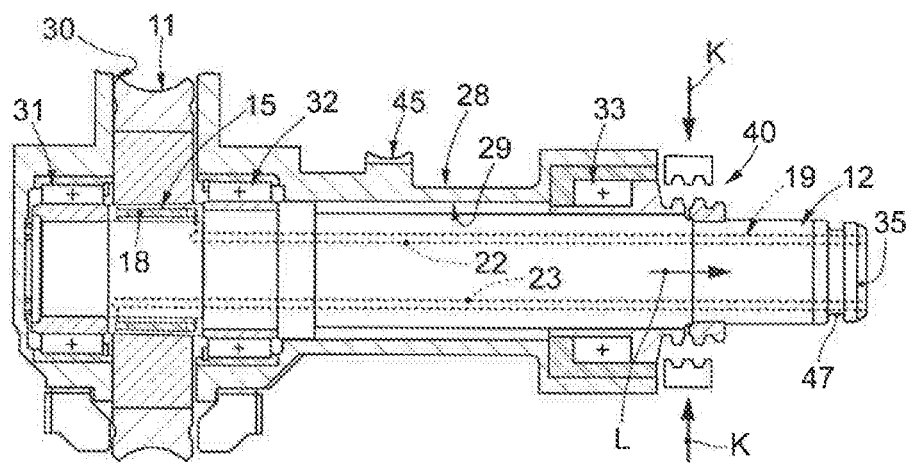

With reference to FIGS. 3-5, we will now describe a method to install one of the rolling rolls 11 on the respective rotation shaft 12.

FIG. 3 shows an operating condition of one of the rotation shaft 12 which is partly removed from the support body 28 to allow the installation of the rolling roll 11.

In particular, the axial holding devices 40 are in the inactive position and the rotation shaft 12 has been removed, for example by means of a gripper device, moving to a position of non-interference with the position of the rolling roll 11 in the housing seating 30 of the support body 28.

The rotation shaft 12 can be provided with an abutment surface 53, for example provided on the opposite side of the shoulder 39, and suitable to cooperate with a corresponding abutment provided for example in the support body 28, in this case in correspondence to the third support elements 33. The abutment surface 53 defines the position of the rotation shaft 12 with respect to the support body 28.

In this condition, although the rotation shaft 12 has been removed from the support body 28, the first support elements 31, the second support elements 32 and the third support elements 33 are kept in a fixed position with respect to the support body 28.

The third support element 33, in particular, remaining in place during the replacement of the rolling rolls 11, allows to support the rotation shaft 12 even if it is not supported by the first support elements 31 and the second support elements 32.

Furthermore, when the rotation shaft 12 is removed from the support body 28, the first bushing 36 and the second bushing 37 remain solid with the rotation shaft 12 while the third bushing 38 is constrained to the support body 28.

When the rotation shaft 12 has been removed, it is possible to insert, through the housing seating 30, the rolling roll 11 to be installed, as indicated by arrow F in FIG. 3.

Subsequently, the rotation shaft 12 is moved axially in the direction indicated by arrow G in FIG. 3, to insert the rotation shaft 12 in the coupling seating 50 of the rolling roll 11.

In particular, the rotation shaft 12 is inserted into the rolling roll 11 by means of a simultaneous movement of both axial thrust and alternate rotation in opposite directions of the rotation shaft 12. In this way, the sliding of the components is limited and the insertion of the rotation shaft 12 is facilitated.

During the axial movement of the rotation shaft 12, the rolling roll 11 is sent to abut against at least one of the walls defining the housing seating 30. The wall defines an abutment and striker plane for the correct positioning of the rolling roll 11, for example to guarantee that the rolling roll 11 is orthogonal with respect to the axis of rotation of the rotation shaft 12.

The action of axial thrust exerted on the rotation shaft 12 determines a first coupling due to conical interference between the housing seating 50 and the coupling member 15.

In this condition, through the first feed branch 22, the work fluid is fed, as indicated by arrow H in FIG. 4, to supply it in the first compartment 20 of the coupling member 15.

The insertion under pressure of the work fluid determines a sliding of the deformer element 18 in the chamber 17 as indicated by arrows J in FIG. 4, and causes it to be wedged therein. The wedging of the deformer element 18 causes a deformation of the tubular body 16 and the consequent mechanical interference with the rolling roll 11.

Merely by way of example, the deformer element 18 can be moved in the chamber 17 by feeding a work fluid at a pressure of about 1000 bar.

The activation of the axial holding devices 40, shown in FIG. 5 by arrows K, causes a subsequent axial retreat of the rotation shaft 12 and of the rolling roll 11 keyed on it, in the direction indicated by arrow L, to determine the correct positioning, or centering, of the rolling roll 11 in the housing seating 30 as shown in FIG. 2.

The operations to replace the rolling roll 11 can be carried out in a series of operations sequentially opposite to those described above.

In particular, the rotation shaft 12 is positioned in axis with the extractor devices which will have the task of partly removing the rotation shaft 12 from the support body 28.

The axial holding devices 40 are then disconnected and the rotation shaft 12 is then removed toward the outside to dispose the rolling roll 11 resting against a wall of the housing seating 30 which is opposite the one mentioned above.

The rolling roll 11 is then unkeyed, introducing the work fluid through the second feed branch 23. The introduction of the work fluid into the chamber 17 allows to modify the geometry of the coupling member 15 and hence to eliminate the mechanical interference between the rolling roll 11 and the coupling member 15.

In this condition, the deformer element 18 is taken to a position of non-interference with the chamber 17, and thus avoids inducing deformations on the tubular body 16, which automatically returns, due to the elastic effect, to the non-deformed condition.

Merely by way of example, it is provided to move the deformer element 18 in the chamber 17 by feeding the work fluid at a pressure of about 1300 bar, that is, a pressure sufficient to overcome the friction generated by the reciprocal interference between the deformer element 18 and the chamber 17 of the tubular body 16.

It is therefore possible to remove the rotation shaft 12 from the rolling roll 11 by means of a gripping member.

To prevent sliding of the various components, the rotation shaft 12 is extracted by both pulling it and rotating it in opposite directions.

The removal of the rotation shaft 12 is further facilitated by the guide given by the third support elements 33 during removal.

In fact, maintaining the third support elements 33 in position allows to reduce the removal times of the rotation shaft 12, to reduce errors and plays between the components and to supply an abutment/guide plane for the removal of the rotation shaft 12.

Once the rotation shaft 12 has been removed, at least partly, and disposed outside the housing seating 30, it is possible to remove the rolling roll 11.

The above operations to install or replace the rolling rolls 11 can be performed sequentially on each of the rotation shafts 12 of the rolling stand 10.

According to a possible embodiment of the present invention, not shown, the rolling stand can be installed on a rotating table which, by means of its rotation, takes each second end 35 of the rotation shaft 12 into correspondence to the extraction and feed means of the work fluid, to replace the respective rolling roll.

It is clear that modifications and/or additions of parts may be made to the rolling stand 10 for metal products as described heretofore, without departing from the field and scope of the present invention.

For example, in possible variants, the deformer element 18 could be configured to move, in the chamber 17, radially with respect to the tubular development of the tubular body 16, so as to deform the latter and define the reciprocal coupling of the rolling roll 11 and the rotation shaft 12.

It is also clear that, although the present invention has been described with reference to some specific examples, a person of skill in the art shall certainly be able to achieve many other equivalent forms of rolling stand 10 for metal products, having the characteristics as set forth in the claims and hence all coming within the field of protection defined thereby.

What is claimed:

1. A rolling stand for oblong metal products comprising a plurality of rolling rolls each installed on a respective rotation shaft, between at least one rotation shaft and the respective rolling roll there being provided a coupling member configured to couple said rolling roll and said rotation shaft to each other, said coupling member comprising a tubular body interposed between said rolling roll and said rotation shaft, wherein said tubular body is provided with at least one chamber in which at least one deformer element is inserted mobile and is able to be selectively driven to deform said chamber and said tubular body,
wherein the at least one deformer element defines a first compartment and a second compartment in the at least one chamber, the first and second compartments being separate from each other and being configured to receive therethrough a work fluid configured to respectively activate or de-activate said coupling member,
wherein said at least one chamber is connected to a fluid-dynamic circuit configured to feed the work fluid, and
wherein said fluid-dynamic circuit is provided respectively with a first feed branch and a second feed branch made in the rotation shaft and connected respectively to the first compartment and to the second compartment of said at least one chamber.

2. The rolling stand as in claim 1, wherein said tubular body and said chamber are outside and distinct from the rotation shaft.

3. The rolling stand as in claim 1, wherein said deformer element is a piston.

4. The rolling stand as in claim 1, wherein said chamber is made in the thickness of said tubular body, closed with respect to the outside of the rolling stand, and connected to a fluid-dynamic circuit for feeding a work fluid.

5. The rolling stand as in claim 4, wherein said fluid-dynamic circuit is integrated in the thickness of said rotation shaft.

6. The rolling stand as in claim 1, wherein said deformer element has a conical tubular conformation, with a cuneiform cross section shape.

7. The rolling stand as in claim 1, wherein said rotation shaft is installed on a support body provided with a tubular cavity in which said rotation shaft is installed, support elements being provided between said support body and said rotation shaft, inserted in the tubular cavity and suitable to support and allow the rotation of said rotation shaft around its axis.

8. The rolling stand as in claim 7, wherein said rotation shafts are installed on respective support bodies, and wherein said support bodies are associated with synchronization devices provided to connect each of said support bodies kinematically with each other.

9. The rolling stand as in claim 7, wherein said rotation shaft is provided with a first support portion and a second support portion, the first and second support portions being located directly upstream and downstream of said coupling member and cooperating with at least some of said support elements, the first support portion having a different size from the second support portion.

* * * * *